Aug. 19, 1969
D. MARTENS
3,461,722
ELECTRODE ASSEMBLY FOR LIQUID LEVEL CONTROLLERS
Filed June 29, 1967
2 Sheets-Sheet 1
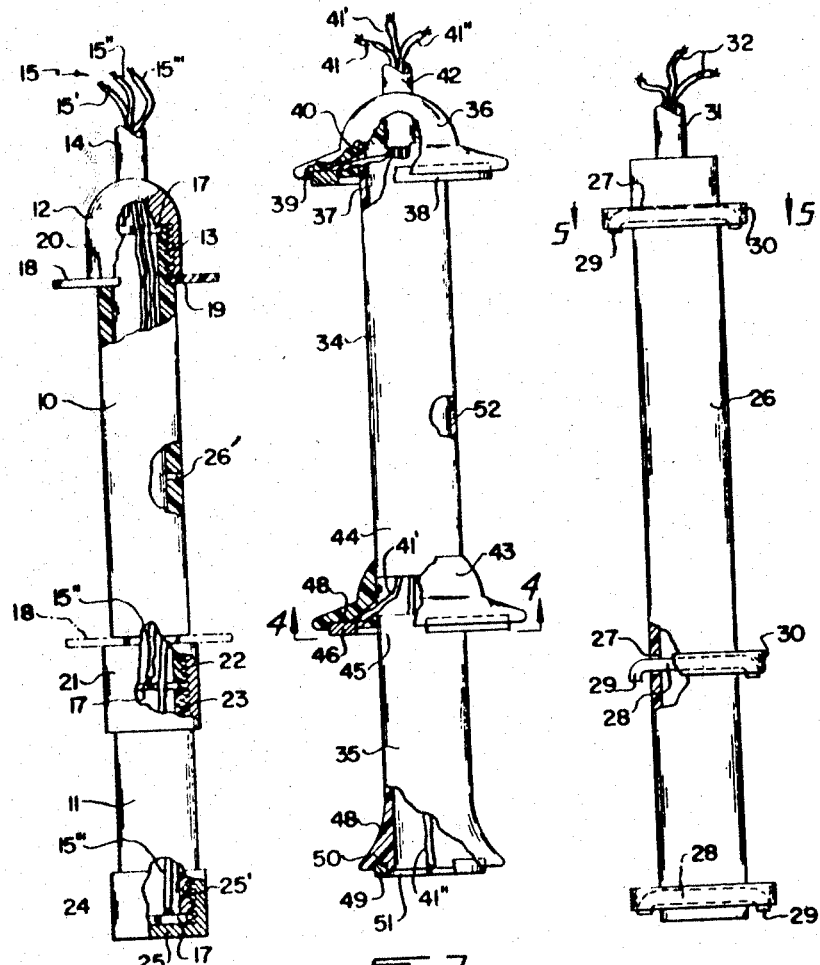
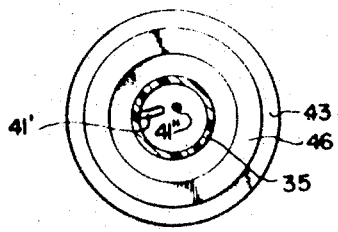
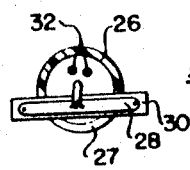
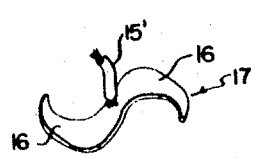
INVENTOR.
DAVID MARTENS

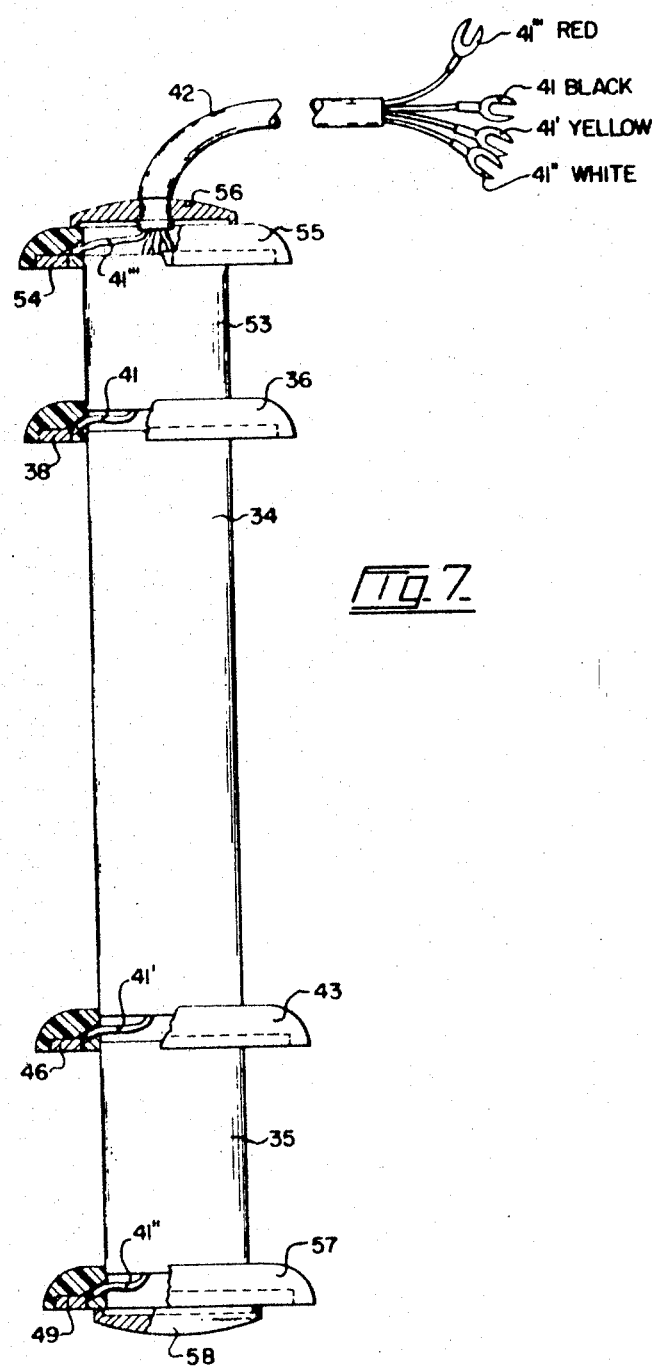

United States Patent Office 3,461,722
Patented Aug. 19, 1969

3,461,722
ELECTRODE ASSEMBLY FOR LIQUID LEVEL CONTROLLERS
David Martens, Winnipeg, Manitoba, Canada, assignor to EPM Manufacturing Co., Ltd., Winnipeg, Manitoba, Canada
Filed June 29, 1967, Ser. No. 650,005
Int. Cl. G01f 23/00
U.S. Cl. 73—304                                      6 Claims

ABSTRACT OF THE DISCLOSURE

This is a floatless liquid level control consisting of an elongated non-conductive tube with electrodes situated along the length thereof and having electric conduits extending through the tube and being connected to the electrodes. The tube is then filled with a sealing material such as liquid plastic which, when set, seals the interior against the ingress of moisture.

My invention relates to new and useful improvements in liquid level controls of the floatless type.

Conventional liquid level controls include a relay which receives a signal from the liquid being controlled, through the means of a suspended electrode in the liquid.

Generally, there are three minimum electrodes required although additional ones can be added for further refinements as required.

The three basic electrodes are a ground or return electrode, an upper start electrode, and an intermediary hold and stop electrode.

This terminology and position of electrodes is, of course, for pumping down or tank emptying applications.

For tank filling or pump up applications, of course, the position of the electrodes is reversed.

Conventional electrode assemblies for fluid control are generally two main types. First, is a suspended electrode, shielded bronze electrode is connected to a wire and hung down in the fluid. Electrode is shielded so that the electrode not of ground potential will not swing and hit the side of a metal container.

On high voltage type controls, the shield is also required for electrical protection.

The second type of electrode assembly is a cast fitting with insulated terminals having electrode rods threaded therethrough and suspended down into the liquid and cut to the desired length for liquid control.

The disadvantages of the first type is that they are difficult to clean, and awkward to set and maintain at the desired height, and slow to assemble and set up.

The disadvantage of the second type is that it requires a relatively expensive assembly and a plurality of fittings to properly mount the electrodes within the liquid.

A further disadvantage of both types is the fact that the connections of the electrical conduits to the electrodes are difficult to seal so that the liquids attack these connections and the copper wire ends of the conduits causing heavy corrosion.

I have overcome all of these inherent disadvantages by providing an elongated non-conductive tube preferably made of plastic, with the electrodes situated along the length thereof and having the electrical conduits passing downwardly through the tube and being connected internally to the electrodes. The entire assembly is then filled with a sealing material such as liquid plastic which, when hardened, completely seals the entire assembly against the ingress of moisture, particularly the connections between the conduits and the electrodes.

A further advantage of the assembly is the fact that the electrodes can be positioned at different heights along the length of the tube readily and easily and, once assembled, cannot be changed inadvertently.

Another object of the invention is to provide a device of the character herewithin described in which the electrode assembly can be removed, cleaned and replaced readily and easily.

Another object of the invention is to provide a device of the character herewithin described in which the electrical conduits are color coded thus eliminating possibility of errors.

A further object of the invention is to provide a device of the character herewithin described which is easily installed inasmuch as it only requires suspension through a hole in the top of the chamber and lowered until the lowermost electrode rests on the bottom.

Yet another object of the invention is to provide a device of the character herewithin described in which the electrodes can be made of any required material to meet corrosion requirements.

A still further object of the invention is to provide a device of the character herewithin described which is simple in construction, economical in manufacture, and otherwise well suited to the purpose for which it is designed.

With the foregoing in view, and all those objects, purposes or advantages which may become apparent from consideration of this disclosure and specification, the present invention consists of inventive concept embodied in the method, process, construction, arrangement of parts, or new use of the same, as herein particularly exemplified in one or more specific embodiments of such concept, reference being had to the accompanying figures in which:

FIGURE 1 is a side elevation of one embodiment of my device.

FIGURE 2 is a side elevation of the preferred embodiment of my device.

FIGURE 3 is a side elevation of a yet further embodiment of my device.

FIGURE 4 is a section substantially along the line 4—4 of FIGURE 2.

FIGURE 5 is a section substantially along the line 5—5 of FIGURE 3.

FIGURE 6 is an isometric enlarged view of the connector used in the embodiment of FIGURE 1.

FIGURE 7 is a side elevation of a further embodiment.

In the drawings like characters of reference indicate corresponding parts in the different figures.

Proceeding therefore to describe my invention in detail, reference should first be made to FIGURE 1 in which 10 illustrates a hollow non-conductive tube preferably made of plastic. 11 indicates a lower tube similar to tube 10.

An upper electrode 12 consists of a substantially dome-shaped metal sleeve internally screw threaded and engageable over the screw threaded end 13 of the tube 10.

An electric conduit casing 14 carries electrical conduit 15 and extends downwardly through the electrode 12, the conduit 15 passing downwardly within the tubes 10 and 11.

One of the conduits specifically designated 15' is connected electrically to the electrode 12 and in this connection reference should be made to FIGURE 6.

This connector is an S-shaped resilient strip having the conduit 15' soldered to the center thereof. It is placed upon the upper end of the tube 10 whereupon the sleeve or electrode 12 is screwed downwardly thereon so that the curved ends 16 of the resilient member or element 17, contact the inner walls of the electrode as it is screwed downwardly.

A shield may also be provided to prevent inadvertent contact of the electrode 12 with the walls of the container and this shield consists of a plastic disc 18 which is clamped between the shoulder 19 formed by the screw threading 13 and the lower end 20 of the electrode 12.

The intermediate electrode 21 consists of a metallic sleeve internally screw threaded and engageable by the screw threaded lower end 22 of the tube 10 and by the screw threaded upper end 23 of the tube 11, a similar connector 17 being provided with contact for the inner walls of electrode 21.

The conduits specifically designated 15" are soldered to this particular member 15 similar to the member 17 incorporated in the upper electrode 12.

The lower or base electrode 24 consists of a metallic sleeve having a closed base 25. This is internally screw threaded and is engageable over the screw threaded lower end 25' of the tube 11, a connector 17 being incorporated as hereinbefore described. The third conduit specifically designated 15''' is connected to this member 17.

If desired, a further shield 18 may be incorporated just above the intermediate electrode 21 as shown in phantom in FIGURE 1.

Either just prior to final assembly or after final assembly, the entire device is filled with liquid plastic. If prior to final assembly, through one end thereof, and if after final assembly, through a small drilling 26' formed within the wall of one of the tubes 10 or 11.

This liquid plastic completely encases the conduits and the connectors 17 with the exception of the portions thereof contacting the inner walls of the electrodes. This together with sealing material used on the screw threads, completely seals the assembly and prevents the ingress of moisture or liquid thus preventing corrosion of the conduits 15 particularly where they connect to connectors 17.

Dealing next with the embodiment illustrated in FIGURE 3, I have provided a hollow tube 26 preferably made of plastic, the walls of which are transversely slotted as at 27 at the location of the electrode 28.

The electrodes in this embodiment are metal rods having down-turned ends 29 and these are placed transversely within the slots 27 together with an elongated plastic shield 30 and they are then cemented in the position.

The conduit casing 31 carries the wires 32 downwardly into the tube 26 and each wire is connected by soldering to the center of the electrode as illustrated by reference character 33 in FIGURE 5.

The entire assembly is then filled with liquid plastic thus sealing these connections against ingress of moisture and the attack thereof of corrosion.

FIGURE 2 illustrates the preferred embodiment of my device in which the body portion comprises a pair of tubes 34 and 35 preferably made of plastic.

A dome-shaped shield 36, also made of plastic is provided at the upper end of tube 34, said shield being drilled upon the underside to receive the upper end 37 of tube 34 to which it is cemented in the conventional manner.

The upper electrode 38 consists of an annular metallic disc which is set into an annular groove 39 formed upon the underside of the shield 36, said annular ring being cemented into this groove.

A small drilling 40 permits the conduit 41 to be conveyed to the electrode 38 and to be soldered thereto in the usual manner.

This is carried in conduit casing 42 which passes downwardly through the dome shield 36 into the interior of tubes 34 and 35.

The intermediate shield 43 is also substantially dome-shaped and is drilled clear through to receive the lower end 44 of tube 34 and the upper end 45 of tube 35, both tubes being cemented into the shield by conventional methods.

The intermediate electrode 46 is also an annular metallic ring set into an annular groove 47 formed in the underside of the shield 43, conduit 41' being connected to the electrode in a manner similar to that hereinbefore described.

The lower end 48 of tube 35 is flared outwardly to form a shield for the lowermost electrode 49. This consists of a metal disc set into a shallow recess 50 formed within the lower end of tube 35 and cemented into position. The conduit 41" is soldered to the inner surface 51 of this disc prior to assembly.

After assembly, the entire unit is soldered with liquid plastic through drilling 52 or through the upper and lower ends just prior to assembly, thus sealing completely the connections between the conduits and the electrodes and prevents the ingress of moisture and the attack thereof of corrosion.

In the embodiment shown in FIGURE 7 an additional electrode has been provided at the uppermost end of the body portion to act as a high water alarm electrode.

This necessitates a further tube of plastic 53 being provided extending upwardly from the tube 34 and above the shield 36 of the start electrode 38

A high water alarm electrode 54, of similar configuration to the other electrodes hereinbefore described, is cemented within a recess formed upon the underside of the shield 55 which engages over the upper end of the tube 53. A seal cap 56 closes the upper end of the tube 53 and receives the conduit 42.

In this particular embodiment, there are four conduits entering the body position, the fourth one 41''' being connected to the electrode 54. This conduit is inserted with the ground conduit 41" and a source of electrical energy (not illustrated) together with an alarm which can take the form of a bell, buzzer, light or the like.

The ground electrode in this embodiment is of similar configuration to the other electrodes and is embedded within the base of a plastic shield 57 which engages over the lower end of tube 35 forming part of the body portion.

This leaves the base of the tube 35 open so that the interior of the body portion can be filled completely with liquid plastic thus sealing the tube and the junctions of the various conduits to the electrodes. When the tube is full, a seal cap 58 is cemented within the base of the tube 35 thus closing the entire assembly.

The conduits 41, 41', 41" and 41''' are illustrated in this FIGURE 7 and are labelled to show the colored coding relationship thus assisting in the connection of these conduits to the relevant electrical circuitry.

I have found that this embodiment is particularly useful inasmuch as if there is any failure due to the coating of the electrodes, for example, the high water electrode will sound an alarm if the water level extends above the start electrode and contacts the high water alarm electrode 54. This would also occur if the pump, operated by the device, failed for any reason.

What is claimed to be the present invention is:

1. An electrode assembly for liquid level controllers comprising in combination an elongated hollow non-conducting body portion, a plurality of exposed electrodes mounted on said body portion along the length thereof in spaced relationship from one another, a plurality of electric conduit means extending through said body portion from one end thereof and means connecting each of said conduit means electrically to one of said electrodes, said body portion being filled with sealing material to prevent ingress of moisture, said sealing material covering said means connecting each of said conduit means to said electrodes, said body portion consisting of at least two non-conducting tubes screwthreadably engageable together, said electrodes comprising an upper starting electrode, an intermediate stopping electrode, and a lower ground electrode, said electrodes comprising metal sleeves, said upper electrode being screw threadably engageable with the upper end of the uppermost tube, said intermediate electrode being clampable between said tubes, said lower electrode being screw threadably engageable with the lower end of said lowermost tube, said means connecting said conduits to said electrodes comprising a resilient S-shaped electrical conducting member clampable between said sleeves and said tubes and in electrical contact with said sleeves, said conduits being secured to said members.

2. The device according to claim 1 which includes a non-conducting shield for at least one of said electrodes, the dimensions of said shield being greater than the dimensions of said electrodes, said shield preventing said electrodes from contacting a conducting surface.

3. The device according to claim 2 in which said shields comprise plastic discs clampable between said electrodes and said tubes.

4. An electrode assembly for liquid level controllers comprising in combination an elongated hollow non-conducting body portion, a plurality of exposed electrodes mounted on said body portion along the length thereof in spaced relationship from one another, a plurality of electric conduit means extending through said body portion from one end thereof, means connecting each of said conduit means electrically to one of said electrodes, said body portion being filled with sealing material to prevent ingress of moisture, said sealing material covering said means connecting each of said conduit means to said electrodes, and a non-conducting shield for at least one of said electrodes, the dimensions of said shield being greater than the dimensions of said electrodes, said shield preventing said electrodes from contacting a conducting surface, said body portion comprising at least two tubes, said electrodes comprising an upper starting electrode, an intermediate stopping electrode, and lower ground electrode, said upper starting electrode comprising an annular metallic ring cemented into the base of said shield, said shield being sealably secured to the upper end of one of said tubes, said intermediate electrode comprising an annular metallic ring cemented into the base of said shield, said shield being sealably secured to the lower end of one of said tubes and to the other end of the other of said tubes, said base electrode comprising a metallic disc cemented to the lower end of said other tube.

5. The device according to claim 4 in which said body portion comprises a hollow tube, said electrode comprising metal rods having down-turned ends, the wall of said tube being slotted transversely, said rods and said shields being cemented transversely into said slots.

6. The device according to claim 4 which includes an upper high water alarm electrode, a starting electrode spaced below said upper electrode and a stop electrode spaced below said start electrode and a ground electrode spaced below said stop electrode, a non-conductive plastic shield covering at least said upper electrode, said start electrode, and said stop electrode.

References Cited
UNITED STATES PATENTS

| | | | |
|---|---|---|---|
| 1,398,270 | 11/1921 | Nickum | 73—304 XR |
| 3,051,631 | 8/1962 | Harbin et al. | |
| 3,373,351 | 3/1968 | Rak | 73—304 XR |

FOREIGN PATENTS

| | | |
|---|---|---|
| 1,386,522 | 12/1964 | France. |

DONALD O. WOODIEL, Primary Examiner